Figure 1:
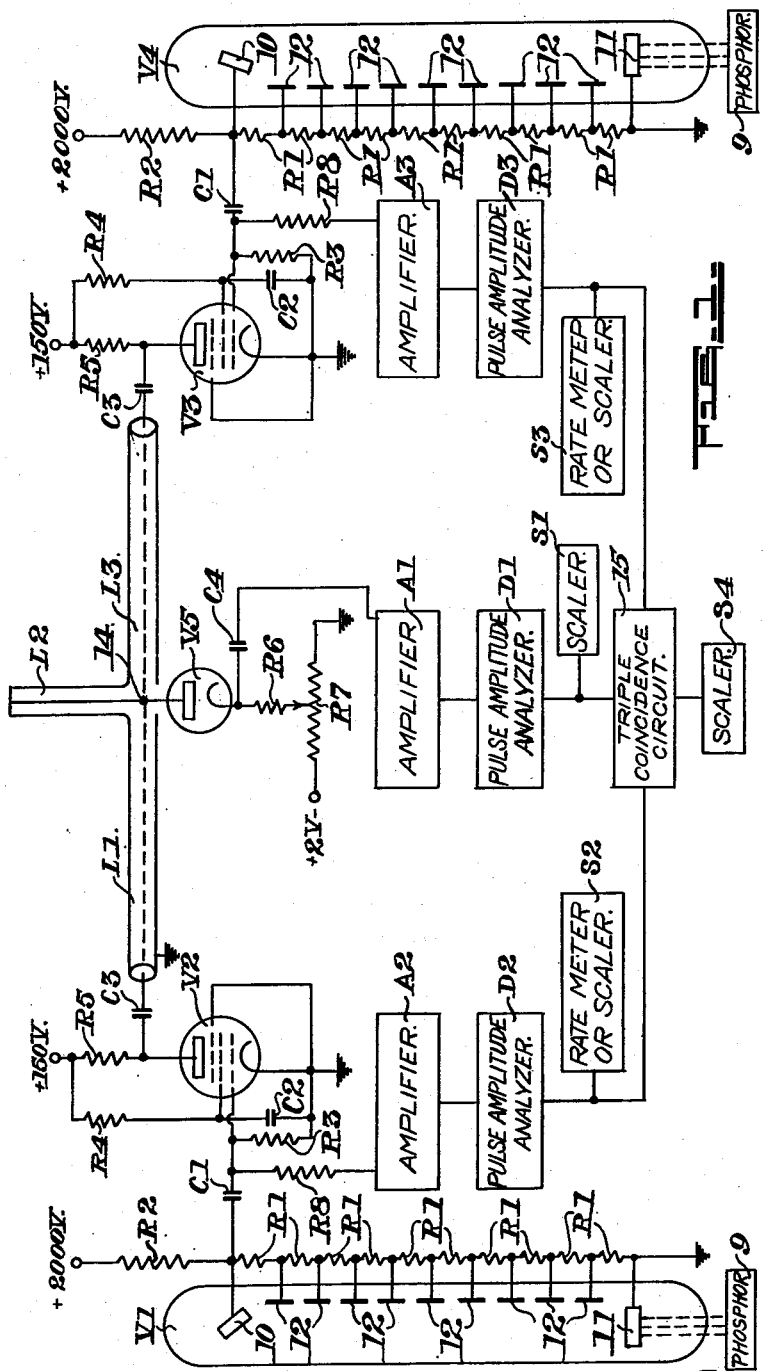

Sept. 9, 1952   R. E. BELL   2,610,303
COINCIDENCE CIRCUIT
Filed Oct. 23, 1950   2 SHEETS—SHEET 2

INVENTOR
ROBERT E. BELL.
BY Smart & Biggar
ATTYS.

Patented Sept. 9, 1952

2,610,303

UNITED STATES PATENT OFFICE 2,610,303

COINCIDENCE CIRCUIT

Robert E. Bell, Deep River, Ontario, Canada, assignor to National Research Council, Ottawa, Ontario, Canada, a body corporate of Canada Application October 23, 1950, Serial No. 191,715

8 Claims. (Cl. 250—207)

The invention relates to a dual coincidence circuit for determining the time correlation between pairs of pulses such as may occur in nuclear physics and cosmic ray experiments.

In general, a dual coincidence circuit is a device which forms an output pulse when a pulse from each of two separate sources is fed to its input within an interval of time called the resolving time of the circuit (designated below as $\tau_0$). If the two input pulses are spaced in time by a greater interval than the resolving time of the circuit, no output pulse is formed. In many of the uses of a coincidence circuit, a difficulty encountered is the occurrence of chance coincidences during the resolving time of the circuit between pulses which are only accidently related in time. The rate of occurrence of chance coincidences is proportional to the product of the resolving time and the rates of arrival of the pulses from the two sources and, therefore, an effective way to keep the chance coincidence rate small compared with the true coincidence rate is to use a circuit having a short resolving time. Also, a coincidence circuit having a short resolving time is useful to measure time intervals between pulses which follow each other at short time intervals, for example, the pulses occurring in the case of very short radioactive lifetimes, and the relation is that the shorter the resolving time, the shorter the lifetime which can be measured. Another requirement for a short resolving time coincidence circuit is in measuring the time of flight of high speed particles from radioactive sources, and the relation is that, for a given length of flight path, the shorter the resolving time, the higher the speed which can be measured.

In coincidence circuits known prior to the present invention, the pulses, before reaching the actual coincidence determining elements of the circuits, were pre-selected to meet a minimum pulse height requirement and sometimes were also pre-treated so that they conformed to a standard pulse height and shape. If the input pulses were not uniform in size and shape, the process, of pre-selecting and pre-treating, introduced delays of varying amounts in the arrivals of the standardized pulses at the coincidence determining element of the circuit. The variation in the amounts of the delays depended on the differences in the original sizes of the pulses, and it was a requirement of the prior art coincidence circuits to have a resolving time great enough to accommodate the variations in size of the incoming pulses. The result was that prior art coincidence circuits had such a long resolving time that they were of little or no value in experiments and measurements requiring a very short resolving time, for example, as short as $10^{-9}$ second.

A dual coincidence circuit having a very short resolving time is made possible by the present inventor's discovery that pulse height selection can be made after coincidence determination.

According to the present invention, a dual coincidence circuit having inputs for electrical pulses from two sources comprises, means connected to each of the inputs for limiting the amplitude of the pulses received at each of the inputs to a predetermined value, a pulse terminating means for terminating each pulse from each of the two sources after a predetermined lifetime, a dual coincidence mixer means arranged to be biased to supply an output pulse only for coincident input pulses greater than the predetermined value, the pulse terminating means having its input connected to the outputs of the amplitude limiting means and having its output connected to the input of the mixer means, a first pulse amplitude analyzer, the mixer means having its output connected to the input of the first pulse amplitude analyzer, a triple coincidence circuit having a first input connected to the output of the first pulse amplitude analyzer, second and third pulse amplitude analyzers having their inputs respectively connected to the outputs of the one and of the other of the sources and having their outputs respectively connected to the second and third inputs of the triple coincidence circuit, and pulse indicating means connected to the output of the triple coincidence circuit.

It is preferred, according to the present invention, to use a predetermined length of short circuited transmission line as the pulse terminating means. Predetermined lengths of transmission line can also be used with advantage to transmit the pulses to the pulse terminating means since the lengths used can be predetermined to compensate for unequal delays to which the pulses may, in some cases, be subjected before reaching the amplitude limiting means. Also, the time of flight of high speed particles can be measured by adjusting the lengths of the transmission lines used to transmit the pulses to the pulse terminating means.

According to the present invention, it is preferred to use scintillation counters comprising photomultiplier tubes and phosphors which produce scintillations in response to radioactive radiation. The scintillations are detected by the photomultiplier tubes and are caused to produce electrical pulses in response thereto. These counters are very sensitive to the presence of radioactive particles and can be operated to have such a high gain that they produce pulses of at least a volt (usually greater than 5 volts) in magnitude making it unnecessary to amplify the pulses before they are transmitted to the pulse terminating means.

Figure 2:
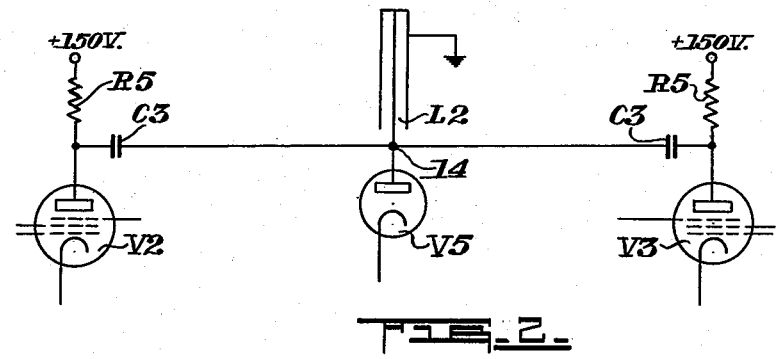
Figure 3:
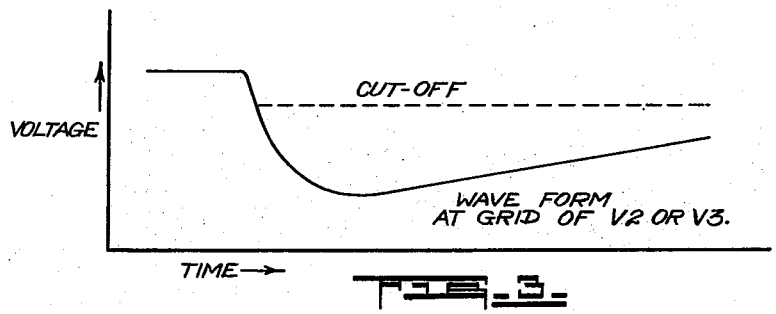
Figure 4:
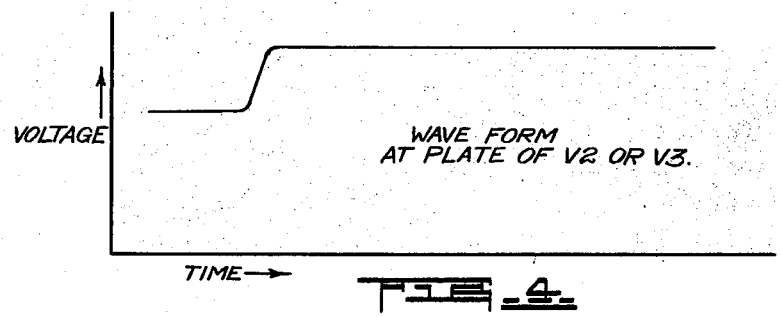
Figure 5:
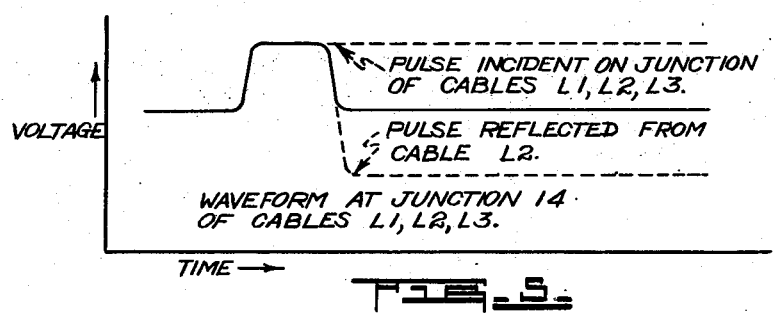

The invention will be further described with reference to the attached drawings, illustrating certain embodiments of it, and in which:

Figure 1 is a schematic block diagram of a circuit embodying the invention,

Fig. 2 is a schematic diagram of part of the circuit shown in Figure 1 and showing a modification of the circuit shown in Figure 1, Figure 3 is a curve showing the waveform at the grid of V2 or V3 of Figures 1 and 2 which result from an incoming pulse, Figure 4 is a curve showing the waveform at the plate of V2 or V3 of Figures 1 and 2 resulting from an incoming pulse, and Figure 5 is a curve showing the waveform at the anode of V5 of Figures 1 and 2 resulting from a pulse as shown in Figure 4.

A pulse coincidence counter, including a circuit according to the invention, is shown in Figure 1 and comprises a pair of scintillation counters having phosphors 9 and photomultiplier tubes V1 and V4 whose anodes 10 are connected respectively through coupling condensers C1 to the control grids of pentode type vacuum tubes V2 and V3. The photomultiplier tubes V1 and V4 have grounded cathodes 11 and have dynodes 12 interconnected by resistors R1 having a resistance of 1 megohm. The anodes 10 are respectively connected through 10,000 ohm load resistors R2 to a +2,000 volt supply. The control grids of the tubes V2 and V3 are connected to ground by grid condensers R3, the suppressor grids and the cathodes being directly grounded. The screen grids of the tubes V2 and V3 are kept at a suitable positive potential by connections through resistors R4 to a +150 volt supply and are by-passed to ground by condensers C2. The plates of the tubes V2 and V3 are supplied with a positive potential from the +150 volt supply through 100 ohm load resistors R5 and are connected through coupling condensers C3 to coaxial transmission lines L1 and L3. The transmission lines L1 and L3 (100 ohm characteristic impedance) meet at a common electrical junction 14 with a short circuited transmission line L2 (50 ohm characteristic impedance). The common electrical junction 14 of the transmission lines is connected to the anode of a diode V5 which may be, for example, an electronic vacuum tube or a germanium crystal. The outer shield of each of the transmission lines L1, L2 and L3 is grounded.

The cathode of the diode V5 is connected through a 10,000 ohm resistor R6 to the variable tap of a potentiometer R7 which has its high potential end taken to a +2 volt supply and its low potential end taken to ground. The cathode of the diode V5 is connected through a coupling condenser C4 to the input of an amplifier A1 which may be of conventional design for the amplification of pulses. For example, the amplifier A1 may have a gain of about 20,000 and a band width of about 2 megacycles. The output of an amplifier A1 connects to the input of a pulse amplitude analyzer D1 of conventional design. The output of the pulse amplitude analyzer D1 is connected to one of the inputs of a triple coincidence circuit 15. A suitable design for the amplifier A1 and the pulse amplitude analyzer D1 is described in the article entitled "A General Purpose Linear Amplifier" by W. H. Jordan and P. R. Bell in volume 18, number 10, October 19, 1947, issue of The Review of Scientific Instruments at pages 703 to 705. The pulse amplitude analyzer may be a pulse height discriminator or a kicksorter. The triple coincidence type of circuit is well known and may be of the type described in the April 26, 1930 issue of Nature, page 636, by Bruno Rossi.

The second input of the triple coincidence circuit 15 is connected to the anode 10 of the photomultiplier tube V1 through the coupling condenser C1, a resistor R8, an amplifier A2 and a pulse amplitude analyzer D2. The third input of a triple coincidence circuit 15 is connected to the anode 10 of the photomultiplier tube V4 through the coupling condenser C1, the resistor R8, an amplifier A3 and a pulse amplitude analyzer D3. The amplifiers A2 and A3 are of similar design to that of the amplifier A1 and the pulse amplitude analyzers D2 and D3 are of similar design to that of the pulse amplitude analyzer D1. The input of the triple coincidence circuit 15 connected to the pulse amplitude analyzer D1 has a scaler S1 of conventional design connected to it. Each of the second and third inputs of the triple coincidence circuit 15 has a ratemeter or scaler S2 and S3 connected to it. The output on the triple coincidence circuit 15 is connected to a scaler S4. The ratemeters or scalers S1, S2, S3 and S4 are of conventional design.

In the following description of the operation of the circuit of Figure 1, it is assumed that nuclear radiations for example, alpha, beta and gamma rays, emitted from a sample of radioactive material are to be counted. The phosphors 9 for the photomultiplier tubes V1 and V4 are placed, relative to the sample of radioactive material, in position such that the nuclear radiations emitted will reach the phosphor 9 of each of the tubes substantially simultaneously. Upon a nuclear radiation exciting the phosphors 9 of the tubes V1 and V4, photons are collected on the cathodes 11 of the tubes V1 and V4 causing the cathodes 11 to emit electrons. As is well known, emission of electrons from the cathode of a photomultiplier tube results in the forming of an avalanche of electrons directed toward the anode of the tube. In apparatus as shown in Figure 1, the avalanches of electrons reaching the anodes of the tubes V1 and V4 form output voltage pulses which are applied to the control grids of the tubes V2 and V3. The waveforms of the pulses supplied to the grids of the tubes V2 and V3 are as indicated in Figure 3. The anode currents in the tubes V2 and V2 are cut off due to pulses applied to their control grids thus limiting the amplitude of the pulses to a predetermined value as shown in Figure 4. The anode currents in the tubes V2 and V3 recover after an interval of time determined by the time constant of the resistor R2 and the interelectrode capacities of the tubes V1 and V2. If, for example, the resistor R1 had a resistance of 10,000 ohms and the capacity to ground of the anode 10 of V1 and the control grid of V2 were 20 $\mu\mu f.$, the time constant would be 0.2 $\mu$ sec. During this time V2 is cut off, and any spurious pulses following the main pulse would not affect the operation of the circuit.

If it is supposed that the transmission line L1 (or L3) is of infinite length, the waveform at the plate of the tube V2 (or V3) would be as shown in Figure 4 assuming that the plate circuit of the tube V2 (or V3) had a very short time constant. However, the transmission lines L1 and L3 are terminated at the junction 14 and, if each of these transmission lines has a 100 ohm characteristic impedance, and the short circuited transmission line L2 has a 50 ohm characteristic impedance, the transmission lines L1 and L3 being matched at the plates of the tubes V2 and V3 by the resistors R5 (100 ohms), no unwanted multiple reflections would occur. However, the short circuited transmission line L2 reflects the pulse transmitted to it from the transmission line L1 (or L3) after an elapsed time of $2p$ seconds, where $p$ is the pulse transit time of the transmission line L2. The result of the reflected pulse from the short circuited transmission line L2 is indicated in Figure 5 in which it is shown that a part of a pulse incident on the junction 14 of the transmission lines L1, L2 and L3 is cancelled by the pulse reflected from the short circuited transmission line L2. The result is an occurrence of a pulse having a duration of $2p$ seconds at the junction 14 of the transmission lines L1, L2 and L3. In the case of a pulse transmitted to the junction 14 being too small, or too slow, for satisfactory formation of a pulse as shown in Figure 5, the pulse formed is smeared out in length and may never reach its maximum amplitude. The maximum amplitude of the pulse formed at the junction 14 is the product of the parallel impedance of the transmission lines L1, L2 and L3 by the standing plate current of the tube V2 (or V3). For example, the standing plate current of the tube V2 (or V3) may be 10 ma. and a typical value of the parallel impedance of the transmission lines L1, L2 and L3 is 25 ohms giving the pulse voltage as ¼ volt.

Under ideal circumstances, with the bias of the diode V5 set at ¼ volt, no pulse would reach the input of the amplifier A1. In practice small pulses would be transmitted through the capacity of the diode V5 and would reach the input of the amplifier A2 with widely distributed amplitude. Such pulses are removed from the input of the amplifier A2 by setting the pulse amplitude analyzer D2 to a bias level E which is just large enough to reject them all. If V1 and V4 are each transmitting pulses, two pulses which occur within the resolving time of the amplifier A1, but not within $\pm 2p$ seconds of each other, will produce a maximum possible output from A1 of 2E due to the capacity-transmission effect, since A1 integrates the pulses. If, however, the pulses occur within $\pm 2p$ seconds of each other, the maximum pulse amplitude at the junction 14 would be greater than ¼ volt and the diode V5 would conduct the top part of the combined pulse. Therefore, amplifier A2 would have a large output, equal to many times E, and so the pulse amplitude analyzer D1 should be set to reject all output pulses less than 2E. It is important that the pulse amplitude analyzer D1 be not set at a level just greater than E (in which case the amplifier A1 would at least in part determine the resolving time) but be set at a level greater than 2E (in which case the diode V5 alone is the nonlinear coincidence element). The output of the pulse amplitude analyzer D1 consists of unselected fast coincidences which are recorded by the scaler S1.

Pulse height selection and the measurement of the individual rates of pulse arrivals at the control grids of the tubes V2 and V3 is accomplished by the two side channels which include the amplifiers A2 and A3, the pulse amplitude analyzers D2 and D3 and the scalers S2 and S3. The amplifiers A2 and A3 accept untreated pulses from the photomultiplier tubes V1 and V4, and the pulse amplitude analyzers D2 and D3 select only those pulses larger than a predetermined value. The triple coincidence unit 15 selects, out of all the fast coincidences from the pulse amplitude analyzer D1, only those fast coincidences which have been caused by individual pulses larger than the sizes selected by D2 and D3 or, in the case of using kicksorters, within the range selected by the kicksorters. The individual rates of pulse arrival can be determined from the readings of the scalers S2 and S3, and the corresponding coincidence rate from the reading of the scaler S4.

The resolving time $2\tau_0$ of the coincidence circuit is much influenced by the bias settings but should be about equal to $4p$ seconds. In typical experimental cases:

| Type of phosphor | Anthracene Crystal | Trans-stilbene Crystal |
|---|---|---|
| Length of transmission line L2. | 32 cm. | 12.5 cm. |
| Propagation velocity in transmission line. | $2.0 \times 10^{10}$ cm./sec. | $2.0 \times 10^{10}$ cm./sec. |
| $p = \frac{\text{length of } L_2}{\text{propagation velocity}}$ | $1.6 \times 10^{-9}$ | $6.25 \times 10^{10}$ sec. |
| $4p$ | $6.4 \times 10^{-9}$ sec. | $2.5 \times 10^{-9}$ sec. |
| $2\tau_0$ observed (width of resolution curve at half maximum). | $5.5 \times 10^{-9}$ sec. | $1.8 \times 10^{-9}$ sec. |
| $2\tau_0$ observed (computed from chance coincidence rate). | $7.0 \times 10^{-9}$ sec. | $2 \times 10^{-9}$ sec. |

The amplitude limiting means used makes it possible to obtain resolving times which are only a fraction of the "rise-time" of the pulse. The rise-time of the pulse is determined chiefly by the decay time of the light from the phosphor. With the present apparatus the resolving time can be made to be less than ¼ the rise time of the pulse.

The resolution curve is of course observed by measuring coincidence rate as a function of the lengths of the transmission lines L1 and L3, using a radioactive source known to contain promptly coincident radiations. The coincidence rate is plotted as a function of delay time for the two counters, yielding a bell-shaped curve of width noted above. The resolving time can also be computed from the observed chance coincidence rate and the two individual counting rates: the chance coincidence rate is the coincidence rate observed when there is so much delay inserted in one or other of the two counter cables that no true coincidences can occur.

The transmission lines L1 and L3 are not necessary under circumstances in which the photomultiplier tubes V1 and V4 are matched in regard to transit time and the phosphors 9 are located at equal distances from the radioactive source. The connections between the tubes V2, V3 and the diode V5 are shown in Figure 2 with the transmission lines L1 and L3 omitted. However, in most cases, the transmission lines L1 and L3 are required to compensate for unequal delays in the arrival of the pulses at the tubes V2 and V3, or to obtain a measure of the time of flight of a particle from a radioactive source, or to measure a short radioactive lifetime.

What I claim as my invention is:

1. A dual coincidence circuit having inputs for electrical pulses from two sources, comprising means connected to each of said inputs for limiting the amplitude of the pulses received at each of said inputs to a predetermined value, pulse terminating means for terminating each pulse from each of said sources after a predetermined lifetime, dual coincidence mixer means arranged to be biased to supply an output pulse only for coincident input pulses whose combined value is greater than a predetermined magnitude, said pulse terminating means having its input connected to the outputs of the amplitude limiting means and having its output connected to the input of said mixer means, a first pulse amplitude analyzer, said mixer means having its output connected to the input of the first pulse amplitude analyzer, a triple coincidence circuit having a first input connected to the output of the first pulse amplitude analyzer, second and third pulse amplitude analyzers having their inputs respectively connected to the outputs of the one and of the other of said sources and having their outputs respectively connected to the second and third inputs of the triple coincidence circuit, and pulse indicating means connected to the output of the triple coincidence circuit.

2. A dual coincidence circuit as defined in claim 1 comprising a first and a second means for delaying the electrical pulses for a predetermined interval of time, the first and the second delaying means being connected to delay, respectively, the transmission of pulses from one source and from the other source to the pulse terminating means.

3. A dual coincidence circuit as defined in claim 2 in which the pulse terminating means is a transmission line of predetermined length short circuited at one end and open circuited at the other end, the open circuited end serving as an input and an output for said pulse terminating means, and the first and second delaying means are each a predetermined length of transmission line connection, respectively, the outputs of the one and of the other of the amplitude limiting means to the open circuited end of the short circuited transmission line.

4. A dual coincidence circuit as defined in claim 3 in which the sources of electrical pulses are photomultiplier tubes arranged to be operated at high enough voltages to produce pulses having a magnitude of at least a volt when said tubes are excited by scintillations.

5. A dual coincidence circuit as defined in claim 3 comprising pulse count indicating means connected to each input of the triple coincidence circuit.

6. A dual coincidence circuit as defined in claim 1 which the pulse terminating means is a transmission line of predetermined length short circuited at one end and open circuited at the other end, the open circuited end serving as an input and an output for the pulse terminating means.

7. A dual coincidence circuit as defined in claim 1 in which the dual coincidence mixer means is a rectifier and the first pulse amplitude analyzer is biased to reject pulses transmitted solely through the capacity associated with said rectifier.

8. A dual coincidence circuit as defined in claim 7 in which an amplifier is connected between the dual coincidence mixer means and the first pulse amplitude analyzer, the first pulse amplitude analyzer being biased to reject pulses less than approximately four times the amplitude, after amplification by said amplifier, of the pulses transmitted solely through the capacity associated with said rectifier.

ROBERT E. BELL.

REFERENCES CITED

The following references are of record in the file of this patent:

UNITED STATES PATENTS

| Number | Name | Date |
| --- | --- | --- |
| 2,226,459 | Bingley | Dec. 24, 1940 |
| 2,517,404 | Morton | Aug. 1, 1950 |
| 2,539,203 | Pohl | Jan. 23, 1951 |